W. W. Goff,
Flour Bolt.

No. 93,297. Patented Aug. 3, 1869.

Witnesses
C. Alexander
A. Smith

Inventor:
W. W. Goff
per J. H. Alexander, Atty

United States Patent Office.

W. W. GOFF, OF AVOCA, NEW YORK.

Letters Patent No. 93,297, dated August 3, 1869.

IMPROVED FLOUR-COOLER.

The Schedule referred to in these Letters Patent and making part of the same.

*To all whom it may concern:*

Be it known that I, W. W. GOFF, of Avoca, in the county of Steuben, and State of New York, have invented certain new and useful Improvements in a Flour-Cooler; and I do hereby declare that the following is a full, clear, and exact description thereof, reference being had to the accompanying drawings, and to the letters of reference marked thereon, which form a part of this specification, in which—

Figure 1:
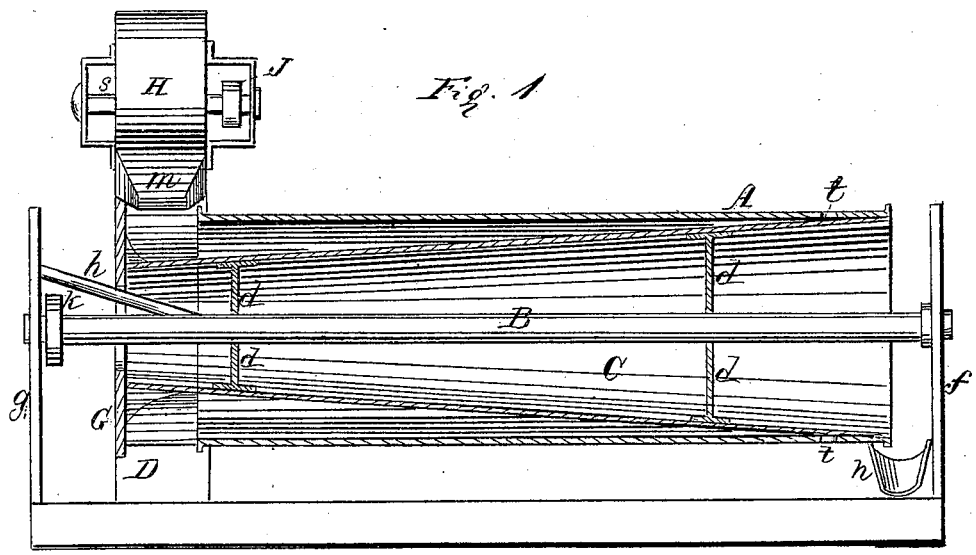
Figure 1 represents a side elevation of my machine.
Figure 2:
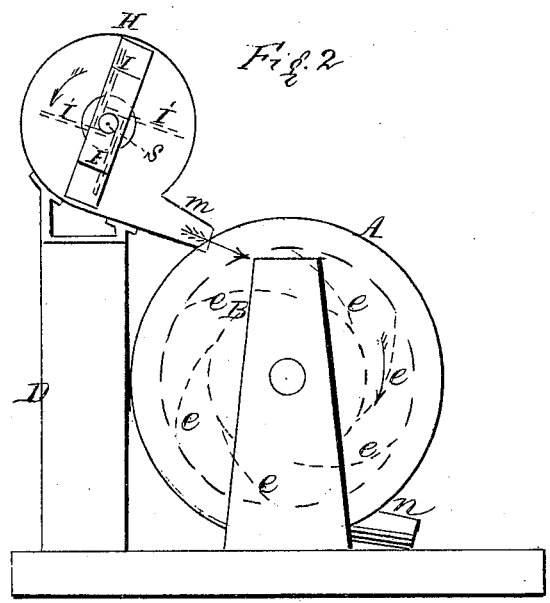
Figure 2 is an end view of the same.

The nature of my invention consists in the construction of a machine for cooling flour after it leaves the stones, and before it reaches the bolt.

To this end, I construct two cylinders on the same shaft, the inner being largest at the end from which the flour is discharged, the said cylinder receiving the flour by means of a conduit inserted in its small end.

My invention further consists in supplying the space between the two cylinders with a current of cold air, by means of a blower, in the manner hereinafter fully described.

A represents the main cylinder, which is connected with the shaft B by means of arms $d$ $d$, which are attached, at their outer ends, to the inner cylinder C. Both cylinders are fastened together at their ends.

The shaft B is supported at its end by uprights $f$ and $g$.

$e$ $e$ designate a series of curved metal plates, fastened at one edge to the end of cylinder A, and at the other edge secured to flange G. The plates $e$ $e$ are sufficiently far apart at their outer ends, and approach each other at the point, where they convey the air into open end of cylinder C.

$h$ represents a trough, one end of which is fastened to upright $g$, and the other enters the open end of cylinder C, through a hole in the end of cylinder A.

K designates the pulley, by which the shaft B is operated.

H represents the blower, which is made circular in form, and having a spout, $m$, at its lower side, for conveying air into cylinder C through the openings between plates $e$ $e$.

The blower H has a shaft, S, passing through its centre, to which the wings I are attached.

The ends of shaft S are supported by brackets fastened to the sides of the blower H.

The shaft S is furnished with the pulley J, by which it is operated.

The blower H is kept in its proper position by the stanchion D.

It will be observed that cylinder A has a number of perforations, $t$, near the end from which the flour is discharged. The object of these perforations is to vent the air after it has performed its function of cooling the external surface of cylinder C.

$n$ is the spout, through which the flour is conveyed to the bolt.

Having thus described my invention,

What I claim, and desire to secure by Letters Patent, is—

1. The blower H, in combination with curved plates $e$ $e$, when constructed, arranged, and operated as described.

2. Cylinders A and C, when combined with blower H, curved plates $e$ $e$, and conduits $h$ and $n$, the whole arranged and operating substantially as described.

In testimony that I claim the foregoing as my own, I affix my signature, in presence of two witnesses.

W. W. GOFF.

Witnesses:
 A. M. SPOONE,
 P. H. NEILL.